(12) United States Patent
Le et al.

(10) Patent No.: US 9,917,513 B1
(45) Date of Patent: Mar. 13, 2018

(54) INTEGRATED CIRCUIT VOLTAGE REGULATOR WITH ADAPTIVE CURRENT BLEEDER CIRCUIT

(71) Applicant: Altera Corporation, San Jose, CA (US)

(72) Inventors: Thien Le, San Jose, CA (US); Ping-Chen Liu, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/559,833

(22) Filed: Dec. 3, 2014

(51) Int. Cl.
*G05F 1/56* (2006.01)
*H02M 3/156* (2006.01)
*G05F 3/16* (2006.01)

(52) U.S. Cl.
CPC .............. *H02M 3/156* (2013.01); *G05F 1/56* (2013.01); *G05F 3/16* (2013.01)

(58) Field of Classification Search
CPC ........................................................ G05F 1/56
USPC ........................................ 323/280, 281, 273
See application file for complete search history.

(56) References Cited

U.S. PATENT DOCUMENTS

| | | | |
|---|---|---|---|
| 8,610,375 B2 | 12/2013 | Chang et al. | |
| 8,723,431 B2 | 5/2014 | Deppe et al. | |
| 2005/0007198 A1* | 1/2005 | Versteegen | H03F 3/45475 |
| | | | 330/264 |
| 2005/0141292 A1* | 6/2005 | Do | G11C 5/147 |
| | | | 365/189.11 |
| 2005/0184824 A1* | 8/2005 | Govind | H03H 7/40 |
| | | | 333/32 |
| 2006/0261793 A1* | 11/2006 | Carpenter, Jr. | G05F 1/618 |
| | | | 323/282 |
| 2008/0297203 A1* | 12/2008 | Niki | H03F 3/04 |
| | | | 327/53 |
| 2012/0038332 A1* | 2/2012 | Lin | G05F 1/575 |
| | | | 323/277 |
| 2012/0049827 A1* | 3/2012 | Hirose | H02M 3/156 |
| | | | 323/284 |
| 2012/0169413 A1* | 7/2012 | Choi | G05F 3/30 |
| | | | 327/539 |
| 2012/0229116 A1* | 9/2012 | Namai | G05F 1/56 |
| | | | 323/311 |
| 2013/6169177 | 7/2013 | Liao et al. | |
| 2013/0278159 A1 | 10/2013 | DelCarmen et al. | |
| 2013/0328415 A1 | 12/2013 | Lee et al. | |
| 2014/0239849 A1 | 8/2014 | DelCarmen et al. | |

(Continued)

*Primary Examiner* — Jue Zhang
*Assistant Examiner* — Trinh Q Dang
(74) *Attorney, Agent, or Firm* — Treyz Law Group, P.C.; Jason Tsai (57) ABSTRACT

An integrated circuit with voltage regulator circuitry is provided. The voltage regulator circuitry may include an adaptive bleeder circuit. The adaptive bleeder circuit may include one or more switchable current leaker paths and an associated bleeder control circuit having current sensing circuitry and voltage comparison circuitry. The current sensing circuitry may monitor the amount of current that is being delivered to a load circuit, whereas the voltage comparison circuitry may output control signals that selectively activate one or more of the current leaker paths depending on the monitored current values. Adaptive bleeder circuit configured in this way can help maintain stability of the voltage regulator while minimizing dynamic power consumption.

16 Claims, 7 Drawing Sheets

(56) References Cited

U.S. PATENT DOCUMENTS

2014/0306751 A1* 10/2014 Nakamoto ................ G05F 1/10
327/541

* cited by examiner

INTEGRATED CIRCUIT VOLTAGE REGULATOR WITH ADAPTIVE CURRENT BLEEDER CIRCUIT

BACKGROUND

This invention relates to integrated circuit voltage regulators, and more particularly, to integrated circuit voltage regulators having current bleeder circuits.

Integrated circuits contain circuitry that is powered at a variety of power supply levels. In a typical scenario, an integrated circuit may contain core logic that is powered using a relatively low power supply voltage and peripheral input-output circuitry that operates at a relatively high power supply voltage. Additional circuit functions may require other power supply voltages.

One way to satisfy the need for multiple power supply voltages on an integrated circuit is to require system designers to supply suitable power supply voltages externally. This approach requires system designers to design circuit boards in which a number of power supply voltages are routed to the power supply pins of the integrated circuit.

It is generally desirable to minimize the number of power supply pins that are used in a given design. The quantity of pins available to supply an integrated circuit with power supply voltages is limited due to considerations such as circuit real estate consumption and device complexity. Although it would be convenient to be able to add a new power supply pin for each new power supply voltage that is needed on an integrated circuit, this is generally not feasible in practice.

One way to overcome the limited number of power supply voltages that are supplied externally to an integrated circuit involves generating power supply voltages using on-chip voltage regulator circuitry. By using an on-chip voltage regulator, it is possible to generate a new power supply voltage that would otherwise not be available.

Voltage regulator circuitry may also be used on an integrated circuit to regulate externally supplied power supply voltages. This helps to ensure that the circuitry on the integrated circuit will be powered at the appropriate voltage level, even if the voltage of the external supply deviates somewhat from its nominal level.

A conventional voltage regulator includes an operational amplifier, an n-channel metal-oxide-semiconductor (NMOS) field-effect transistor, and a resistor. The operational amplifier has a first input that receives a reference voltage, a second input, and an output. The NMOS transistor has a drain terminal that is connected to a positive power supply line, a gate terminal that is shorted to the output of the operational amplifier, and a source terminal that is shorted to the second input of the operational amplifier. The resistor has a first terminal that is connected to the source terminal of the NMOS transistor and second terminal that is connected to a ground power supply line. The source terminal of the NMOS transistor may serve as the output of the voltage regulator. Other on-chip circuitry may receive a regulator voltage from the output of the voltage regulator and may thereby draw a load current from the regulator voltage.

Arranged in this way, the operational amplifier and the NMOS pass transistor are connected in a negative feedback configuration. The resistor serves as a fixed leakage current path that ensures stability of this feedback loop across worst-case process, voltage, and temperature (PVT) variations (i.e., the resistor helps to increase extra phase margin for voltage regulator). The fixed leakage current path, however, is always active and can increase the overall power consumption of the voltage regulator by up to 10% or more.

SUMMARY

An integrated circuit that includes voltage regulator circuitry is provided. The voltage regulator circuitry may include an operational amplifier, a pass transistor coupled to the operational amplifier in a negative feedback configuration, and an adaptive bleeder circuit that is coupled to the pass transistor and that is selectively enabled to provide at least one leakage current path for the voltage regulator.

The leakage current path (sometimes referred to as a current leaker path or a current bleeder path) may include a resistor and a switch coupled in series with the pass transistor between positive and ground power supply lines. The adaptive bleeder circuit may also include a control circuit that generates an output signal for controlling the switch in the leakage current path.

The control circuit may include current sensing circuitry and voltage comparison circuitry. The current sensing circuitry may include current mirroring circuitry. The voltage comparison circuitry may include at least one comparator that receives a sensing voltage from the current sensing circuitry and a regulated voltage from the pass transistor and that generates the output signal for controlling the switch.

The pass transistor may be used to deliver a load current, where the leakage current path is activated when the load current falls below a predetermined threshold and is deactivated when the load current exceeds the predetermined threshold. If desired, two or more current leakage paths may be used, each of which may be activated according to different switching criteria being satisfied.

Further features of the invention, its nature and various advantages will be more apparent from the accompanying drawings and the following detailed description of the preferred embodiments.

DETAILED DESCRIPTION

The present invention relates to voltage regulators. The voltage regulators of the present invention may be used to regulate power supply voltages or any other suitable voltages. The use of the voltage regulators to produce a regulated power supply voltage is described herein as an example.

The voltage regulators may be formed on integrated circuits. The integrated circuits in which the voltage regulators may be formed may be any suitable integrated circuits in which it is desired to regulate a power supply voltage or other voltage. For example, the integrated circuits may be memory chips, digital signal processing circuits, microprocessors, application specific integrated circuits, or any other suitable integrated circuit. With one suitable arrangement, which is described herein as an example, a voltage regulator in accordance with the invention is used to regulate a power supply voltage on a programmable integrated circuit.

Figure 1:
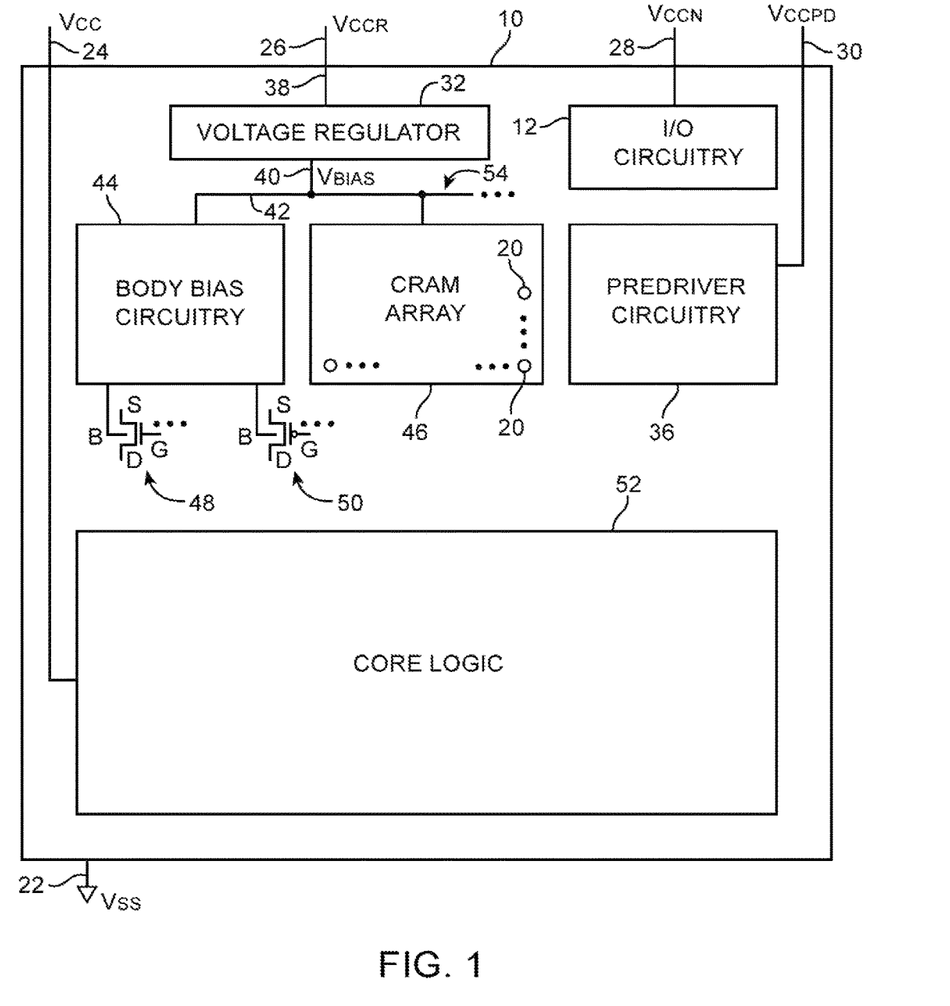
FIG. 1 is a diagram of an illustrative integrated circuit containing a voltage regulator in accordance with an embodiment of the present invention.
Figure 2:
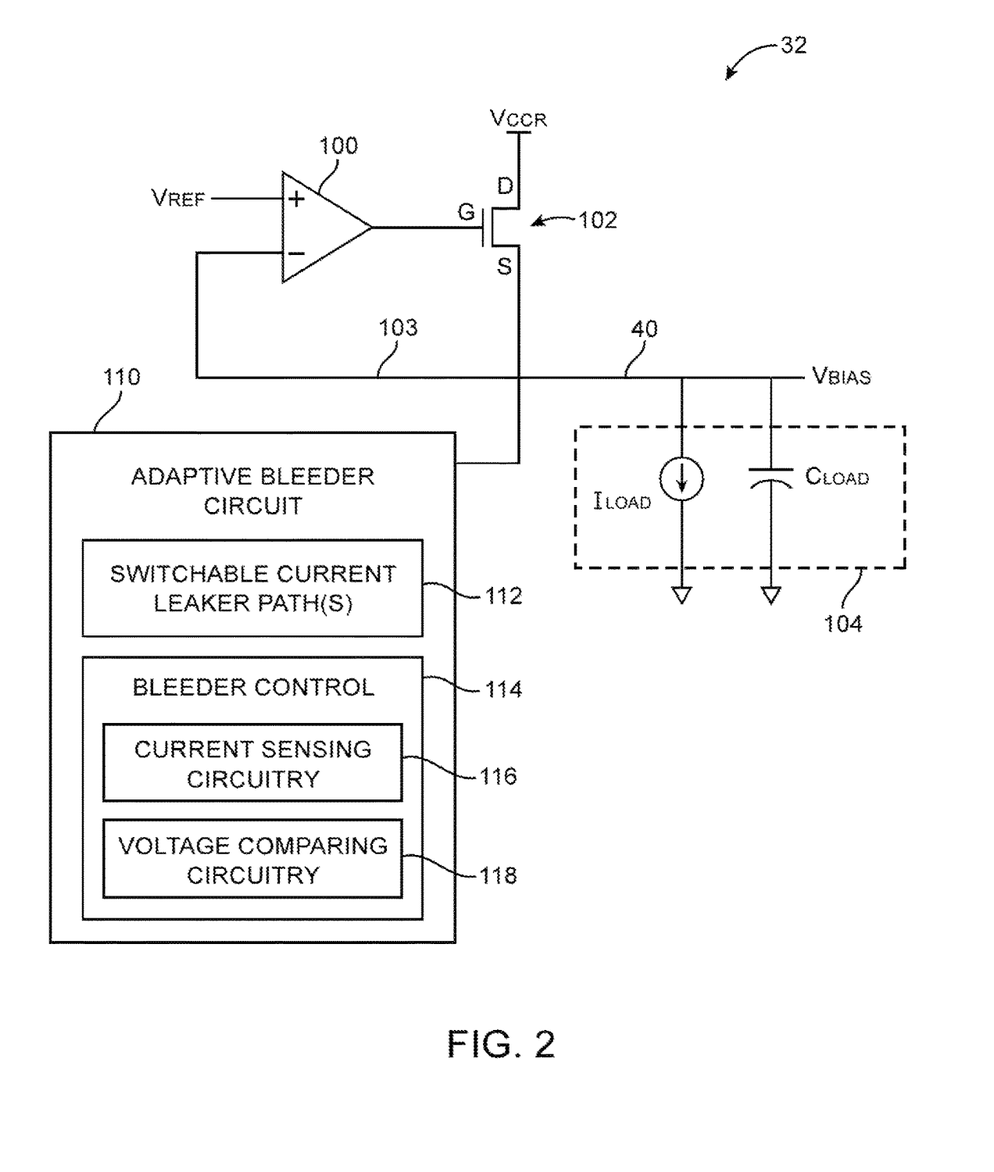
FIG. 2 is a diagram of an illustrative voltage regulator having an adaptive bleeder circuit in accordance with an embodiment of the present invention.

As shown in FIG. 1, an integrated circuit such as a programmable integrated circuit 10 may include circuitry that operates at a number of different power supply voltage levels. In the example of FIG. 2, device 10 is provided with a ground power supply voltage Vss (e.g., zero volts) at pin 22. Device 10 is also provided with positive power supply voltages Vcc, Vccr, Vccn, and Vccpd at respective positive power supply terminals 24, 26, 28, and 30. This arrangement is merely illustrative. Integrated circuits such as integrated circuit 10 of FIG. 2 may be provided with any suitable power supply voltages.

In the example of FIG. 2, programmable integrated circuit 10 contains core logic 52. Core logic 52 may be powered using a relatively low power supply voltage Vcc. Using a low power supply voltage in the core logic helps to reduce power consumption. Core logic 52 is generally located in the center of an integrated circuit.

Peripheral circuitry such as input-output circuitry 12 may be powered using a relative larger power supply voltage Vccn. Use of the larger power supply voltage Vccn ensures that input and output drivers in input-output circuitry 12 are able to communicate properly with external circuitry. As an example, the power supply voltage Vccn allows output drivers to transmit outgoing data signals at voltage levels that are compliant with commonly used communications standards. These standards may require the use of relatively large signal voltages to increase noise immunity on circuit board busses. If only lower voltages such as Vcc were available to power the input-output drivers, it might be difficult or impossible to interface with other integrated circuits.

If desired, device 10 may be powered using an intermediate power supply voltage Vccpd. The value of Vccpd generally lies between the low voltage associated with Vcc and the higher voltage associated with Vccn. Power supply voltage Vccpd may be used to power predriver circuitry 36. Predriver circuitry 36 may contain output drivers that drive output signals from core logic 52 into output buffer circuitry in input-output circuitry 12. Predriving output signals into input-output circuitry 34 helps to improve device performance while reducing overall power consumption.

With one suitable arrangement, the core logic power supply voltage Vcc is about 0.85 volts, the input-output power supply voltage Vccn is set by a system designer to a level between about 1.0 volts and 3.0 volts, and the predriver power supply voltage level is set to about 2.0 to 3.0 volts (the system designer may be required to set Vccpd to 3.0 volts when Vccn is 3.0 volts). These are merely power supply voltage levels that may be used. As technology improves with time, it is expected that lower power supply voltages may be used. In general, any suitable voltage levels may be used if desired.

Integrated circuit 10 may include circuitry that uses other power supply voltages. In the example of FIG. 2, device 10 is supplied with an external power supply voltage Vccr at terminal 26. Path 38 is used to convey power supply voltage Vccr to the input of a voltage regulator circuit such as voltage regulator 32. Voltage regulator 32 produces a corresponding regulated power supply voltage Vbias at its output 40.

Programmable integrated circuit 10 of FIG. 2 includes circuitry such as body bias circuitry 44 and configuration random-access-memory (CRAM) array 46 (or other memory elements) that is powered using the regulated power supply voltage Vbias. The voltage Vbias is typically elevated with respect to Vcc. The voltage Vbias may, as an example, be a voltage of about 1.0-2.0 volts. This is merely illustrative. Voltage Vbias may be equal to Vcc or less than Vcc.

Voltage Vbias may be supplied to body bias circuitry 44 and CRAM array 46 using voltage regulator output line 40 and distribution path 42. Circuitry such as body bias circuitry 44 may be used to apply a body bias signal to the body (B) terminals of n-channel metal-oxide-semiconductor transistors such as transistor 48 and p-channel metal-oxide-semiconductor transistor such as transistor 50. Transistors such as transistors 48 and 50 may, if desired, be part of core logic 52. Body biasing arrangements may be used to improve transistor performance or may be used to reduce transistor leakage currents and thereby reduce power consumption on the integrated circuit 10.

CRAM array 46 may contain an array of programmable random-access-memory elements 20. Circuitry in CRAM array may be used to apply elevated power supply voltages to the elements 20 during certain operations (e.g., during normal operation following write operations at lowered voltages). The elevated power supply voltages may be equal to Vbias or may be derived from Vbias. When an elevated power supply voltage is used in CRAM memory elements 20, the static output signals that are generated by the CRAM memory elements 20 based on their loaded configuration data may drive associated components (e.g., n-channel metal-oxide-semiconductor transistors) in core logic 52 more strongly than would otherwise be possible. The use of an elevated power supply voltage such as Vbias in CRAM array 46 may therefore enhance the performance of programmable logic device integrated circuit 10.

As indicated by path extension 54, the distribution path 42 may extend to other regions of circuitry on device 10. The use of the voltage Vbias as a power supply input voltage to body bias circuitry 44 and CRAM array circuitry 46 is merely illustrative. If desired, voltage Vbias may also be used to power core logic 52. Voltage regulator 32 may regulate any suitable input voltage to produce any suitable regulated output voltage on device 10.

FIG. 2 is a diagram of illustrative voltage regulator circuitry 32. As shown in FIG. 2, voltage regulator circuitry 32 may include an operational amplifier 100, an n-channel transistor 102 (sometimes referred to as an n-channel "pass transistor"), and an adaptive bleeder circuit 110. Operational amplifier 100 may include a first (+) input that receives a reference voltage Vref, a second (−) input, and an output. The n-channel pass transistor may have a drain terminal that is coupled to a positive power supply line (e.g., a power supply line on which positive power supply voltage Vccr is provided), a gate terminal that is coupled to the output of amplifier 100, and a source terminal that is coupled to the second (negative) input of amplifier 100 via a feedback path 103. The terminology of the source and drain terminals of the n-channel transistor are sometimes interchangeable and may therefore sometimes be referred to as "source-drain" terminals. The arrangement in which operational amplifier 100 and n-channel transistor 102 are interconnected is sometimes referred to as a negative feedback configuration.

The regulated output voltage Vbias may be provided at the source node of transistor 102 (which effectively serves as the output of voltage regulator 32). Circuit 104 may represent any active circuit that receives Vbias from voltage regulator 32 via path 40. Iload and Cload may therefore represent the current and capacitive load of the active circuit, respectively.

Typically, under the slow process corner and low temperature conditions, the leakage current on the integrated circuit device is small under standby mode. This can result in the n-channel pass transistor producing a minimal amount of current in order to ensure that Vbias is driven to the desired voltage level. Since the current provided by the re-channel pass transistor should equal the amount of current (Iload) drawn by the load circuit, the system may not be stable due to the high output resistance of voltage regulator 32, especially when the amount of current being passed through the n-channel transistor is small.

In accordance with an embodiment, a bleeder circuit such as adaptive bleeder circuit 110 is provided to ensure that the voltage regulator system is stable across all process, voltage, and temperature (PVT) conditions. Adaptive bleeder circuit 110 can be selectively activated when Iload is less than some predetermined threshold level to help drain or "bleed" off any excess current passing through n-channel transistor 102. Bleeder circuit 100 can also be selectively deactivated when Iload is greater than the predetermined threshold level to allow n-channel pass transistor 102 to efficiently deliver the necessary current to the load without unnecessarily burning current through the bleeder current. Operated in this way, adaptive bleeder circuit 110 that is only enabled when absolutely necessary and that is disabled at other times can help ensure stability of the feedback loop while minimizing power consumption (e.g., circuit 110 may be dynamically adjusted in real time depending on the current requirements of the load circuit 104).

Still referring to FIG. 2, adaptive bleeder circuit 110 may include one or more switchable current leaker (or leakage) paths 112 and an associated bleeder control circuit 114. Bleeder control circuit 114 may include current sensing circuitry 116 and voltage comparison circuitry 118. Paths 112 may couple the voltage regulator output node to a corresponding power supply line such as a ground power supply line. At least one resistive component and one switching component may be interposed in each path 112. The switching component may be turned on when a leakage/bleeder current path is desired and may be switched off when the load circuit is drawing a substantial amount of current from the n-channel pass transistor 102.

The bleeder control circuit 114 may be used to control the state of the switching component in leaker path(s) 112. Current sensing circuitry 116 in bleeder control 114 may include a current mirroring mechanism that can be used to monitor the amount of current that is flowing through pass transistor 102. The current mirror may generate a corresponding sensing voltage, which can then be fed to voltage comparison circuitry 118 for determining whether leaker path(s) 112 should be turned on or off (e.g., by comparing the sensing voltage to the regulated output voltage).

Figure 3:
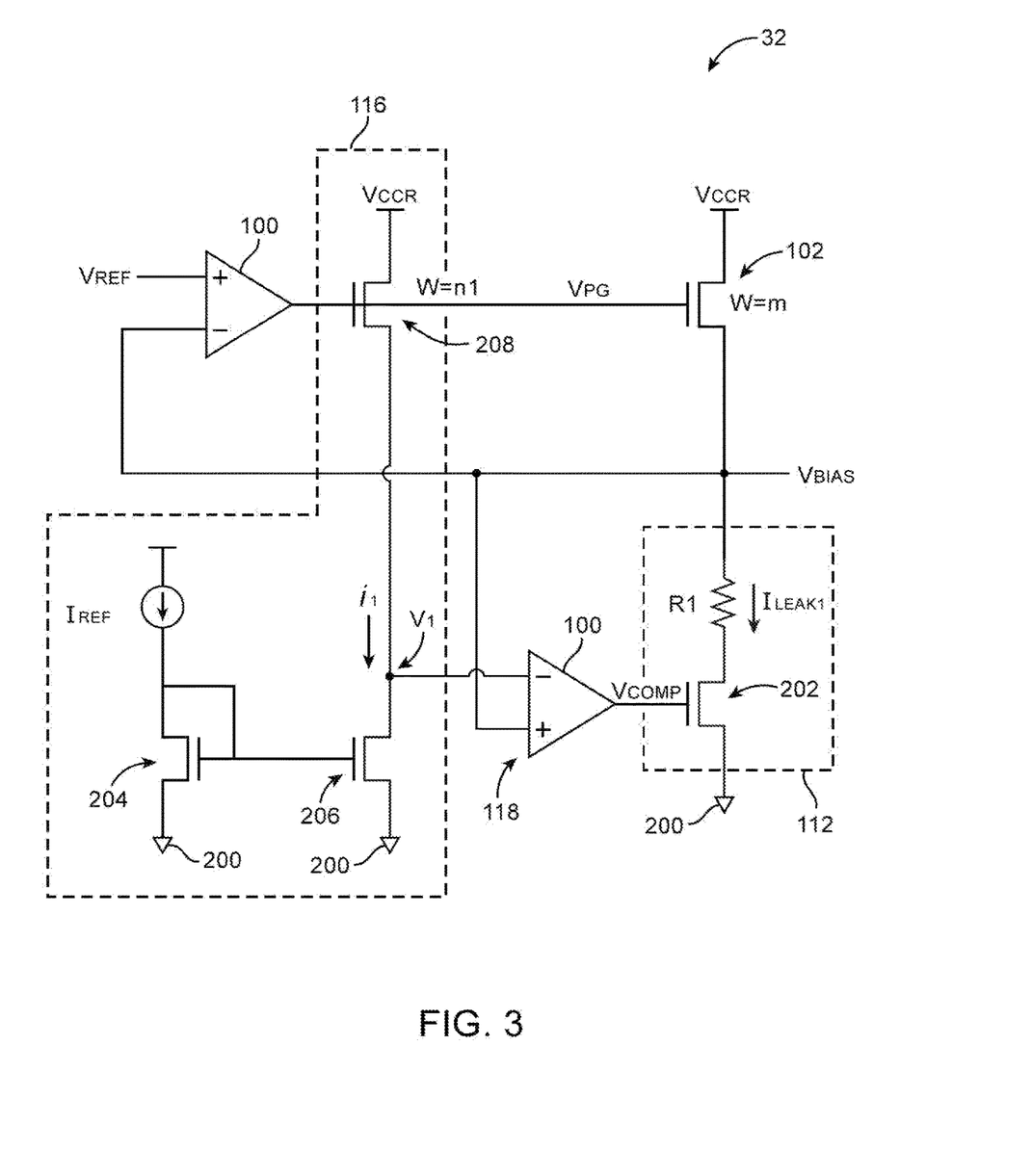
FIG. 3 is a circuit diagram showing one suitable circuit implementation of the voltage regulator of the type shown in FIG. 2 in accordance with an embodiment of the present invention.

FIG. 3 is a circuit diagram showing one suitable implementation of voltage regulator 32. As shown in FIG. 3, a switchable leaker path 112 may include a resistor R1 and a pull-down transistor 202 coupled in series between the regulator output node and ground power supply line 200; voltage comparing circuitry 118 may be implemented using a digital comparator having a positive and negative input; and current sensing circuitry 116 may include at least n-channel transistors 204, 206, and 208 coupled in a current mirror configuration.

Transistor 208 may have a drain terminal at which Vccr is supplied, a gate terminal that is shorted to the gate of transistor 102, and a source terminal that is coupled to ground line 200 via transistor 206. Transistor 204 may have a source terminal that is coupled to ground 200, a drain terminal that receives reference current Iref, and a gate terminal that is shorted to its own drain terminal and also to the gate of transistor 206 (e.g., transistor 204 may be configured in a diode-connected arrangement).

The voltage at the gate of pass transistor 102 is indicated as pass gate voltage Vpg. The current flowing through transistors 208 and 206 may be equal to i1. Currently i1 can fluctuate depending on the value of pass gate voltage Vpg at any given point in time.

In the example of FIG. 3, pass transistor 102 may have a width m, whereas transistor 208 has a width n1. Generally, width m should be substantially larger than n1 (e.g., m should be at least 10 times n1, at least 100 times n1, at least 1000 times n1, etc.) since n-channel transistor 102 needs to be sufficiently large to drive the desired output load of the voltage regulator. The voltage V1 provided at the node where transistor 208 connects to transistor 206 may serve as the converted sensing voltage output by current sensing circuitry 116 (e.g., circuitry 116 converts i1 to corresponding sensing voltage V1). The particular ratio of m to n1 should be chosen such that voltage V1 is approximately equal to Vbias during normal operating conditions.

Comparator 118 may have a first (+) input that receives Vbias from the regulator output node, a second (−) input that receives V1 from the output of current sensing circuitry 116, and an output on which signal Vcomp is provided. Arranged in this way, comparator 118 may be configured to assert Vcomp in response to detecting that Vbias is greater than V1 and to deassert Vcomp in response to detecting that Vbias is less than V1. As shown in FIG. 3, comparator output voltage Vcomp may be used to control the switching transistor 202 in leaker path 112. Thus, whenever Vcomp is high, transistor 202 is turned on and bleeder current ileak1 is allowed to flow through that leaker path. When Vcomp is low, transistor 202 will be turned off and the leaker path is switched out of use.

The net effect of sizing m and n1 properly will result in voltage comparator 118 flipping whenever the current load Iload exceeds or falls below a predetermined minimum required current leakage amount Ileak*. This behavior is illustrated in the state diagram of FIG. 4. Upon power-on reset operations, the voltage regulator may be placed in a first state 290 in which leakage switch (e.g., transistor 202 of FIG. 3) is turned off.

Figure 4:
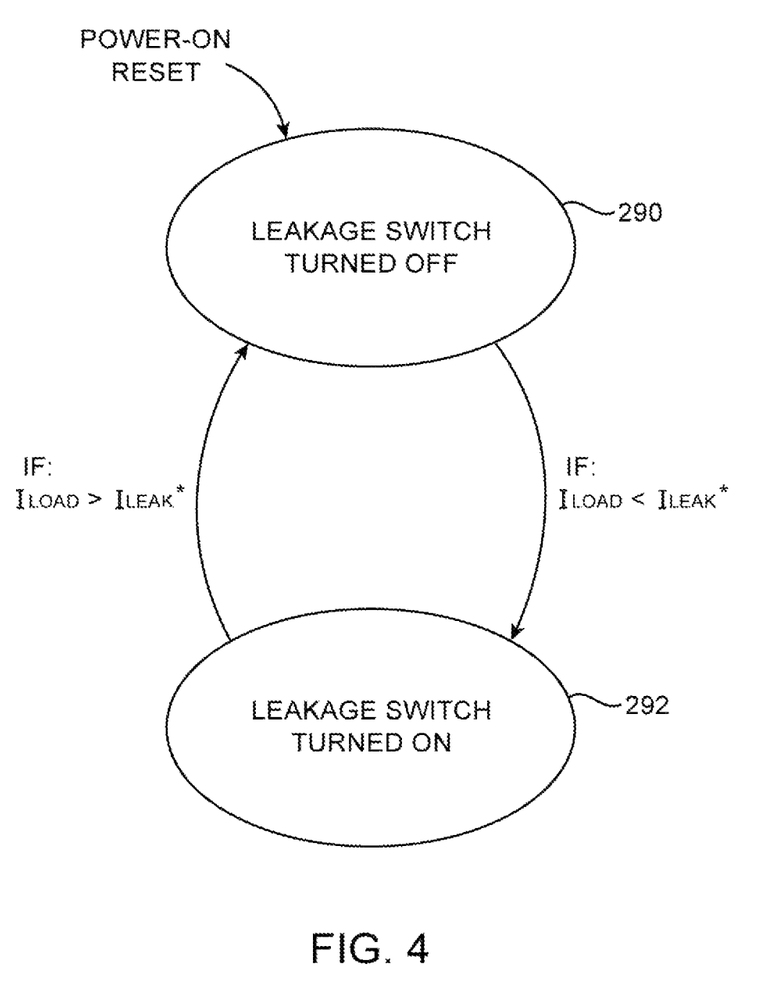
FIG. 4 is a diagram showing possible states in which the voltage regulator of FIG. 3 may be operated in accordance with an embodiment of the present invention.

If the output current load Iload falls below the minimum required current leakage threshold Ileak*, the pass gate voltage Vpg will decrease to supply less current through the pass transistor. In response to this decrease in Vpg, because the current i1 is constant (due to the current mirror and because the gate-to-source voltage Vgs at n-channel transistor 206 is constant), the source voltage of transistor 208 must be decreased to make sure Vgs of transistor 208 is also constant. Voltage V1 will fall lower than Vbias in response to the decrease in Iload. Comparator 118 will detect this change and then assert Vcomp to turn on transistor 202 to activate leaker path 202 (e.g., the voltage regulator may transition from the first state 290 to the second state 292).

While regulator 32 is in the second state, if the output current load Iload rises higher than the minimum required current leakage threshold Ileak*, the pass gate voltage Vpg will increase to supply more current through the pass transistor. In response to this rise in Vpg, because the current i1 is constant (due to the current mirror and because the gate-to-source voltage Vgs at n-channel transistor 206 is constant), the source voltage of transistor 208 must be increased to make sure Vgs of transistor 208 is also constant. Voltage V1 is moved up higher than Vbias in response to the increasing of Iload. Comparator 118 will detect this change and then deassert Vcomp to turn off transistor 202 and deactivate leaker path 202 (e.g., the voltage regulator may transition from second state 292 back to the first state 290).

Operated in this way, voltage regulator 32 only provides the extra bleeder current under the criteria that the load current is less than the predetermined required leakage threshold Ileak*. This extra current will therefore not be contributing to the total current consumption since the leaker path 112 is switched out of use the majority of the time. The use of adaptive bleeder circuit 110 that monitors the current flowing through pass transistor 102 in real time and that selectively activates the leaker path(s) 112 based on the monitored current may therefore help substantially reduce current consumption of the voltage regulator while maintaining stability of the system across PVT variations.

Figure 5:
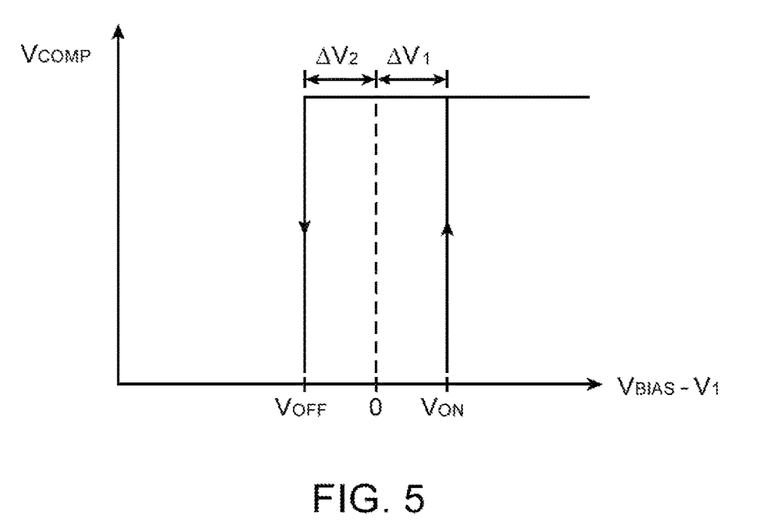
FIG. 5 is a plot showing a hysteresis characteristic associated with a comparator that may be included in the voltage regulator of FIGS. 2 and 3 in accordance with an embodiment of the present invention.

In order to further reduce dynamic switching, comparator 118 may be provided with hysteresis. FIG. 5 is a plot showing a hysteresis characteristic associated with comparator 118 of the type described in connection with FIGS. 2 and 3. The plot of FIG. 5 has an x-axis that plots the differential voltage at the input of comparator 118 (i.e., the difference between Vbias and V1) and a y-axis that illustrates when the corresponding output Vcomp is driven high and low.

As shown in FIG. 5, Vcomp may only be asserted when the differential input voltage (i.e., Vbias minus V1) is at least equal to Von, which is $\Delta V1$ higher than the nominal trip point. In other words, Vbias will have to be at least $\Delta V1$ higher than V1 for the comparator to drive Vcomp high. On the other hand, Vcomp may only be deasserted when the differential input voltage is at least less than Voff, which is $\Delta V2$ less than the nominal trip point. In other words, V1 will have to be at least $\Delta V2$ higher than Vbias for the comparator to drive Vcomp low. In general, $\Delta V1$ and $\Delta V2$ may have the same value or different values.

Figure 6:
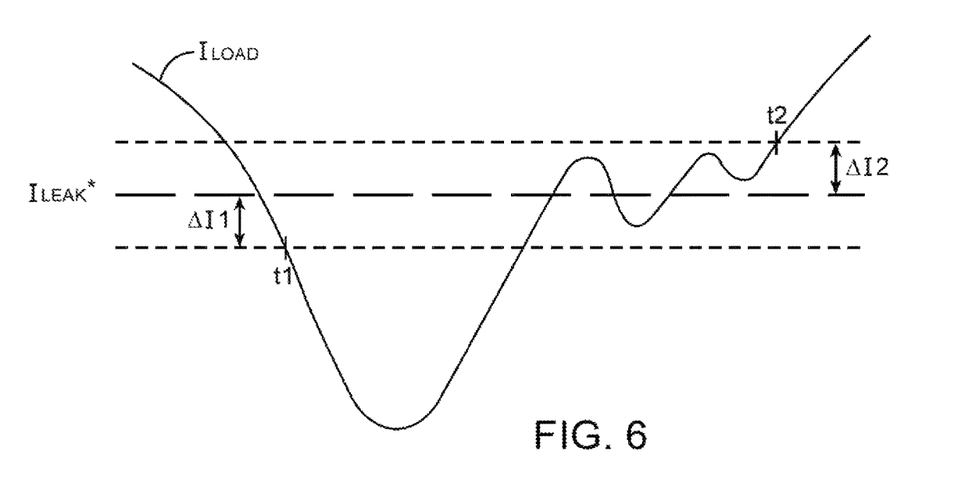
FIG. 6 is a timing waveform illustrating when the adaptive bleeder circuit may be enabled and disabled in accordance with an embodiment of the present invention.

FIG. 6 is a timing diagram that plots Iload as a function of time and that illustrates how comparator 118 may behave during normal device operation. Prior to time t1, the leaker path 112 may be turned off. At time t1, Iload may be at least $\Delta I1$ less than Ileak*, which will result in the comparator asserting Vcomp and turning on the leaker path. The amount $\Delta I1$ may be proportional to $\Delta V1$ associated with the hysteresis of comparator 118.

At time t2, Iload may be at least $\Delta I2$ higher than Ileak*, which will result in the comparator deasserting Vcomp and turning off the leaker path. The amount $\Delta I2$ may be proportional to $\Delta V2$ associated with the hysteresis of comparator 118. As shown in FIG. 6, the hysteresis may help prevent comparator 118 from unnecessary switching when Iload exhibits small variations about Ileak*. The hysteresis can therefore help further minimize dynamic power consumption. If desired, $\Delta I1$ and $\Delta I2$ may be the same amount or may be different amounts.

Figure 7:
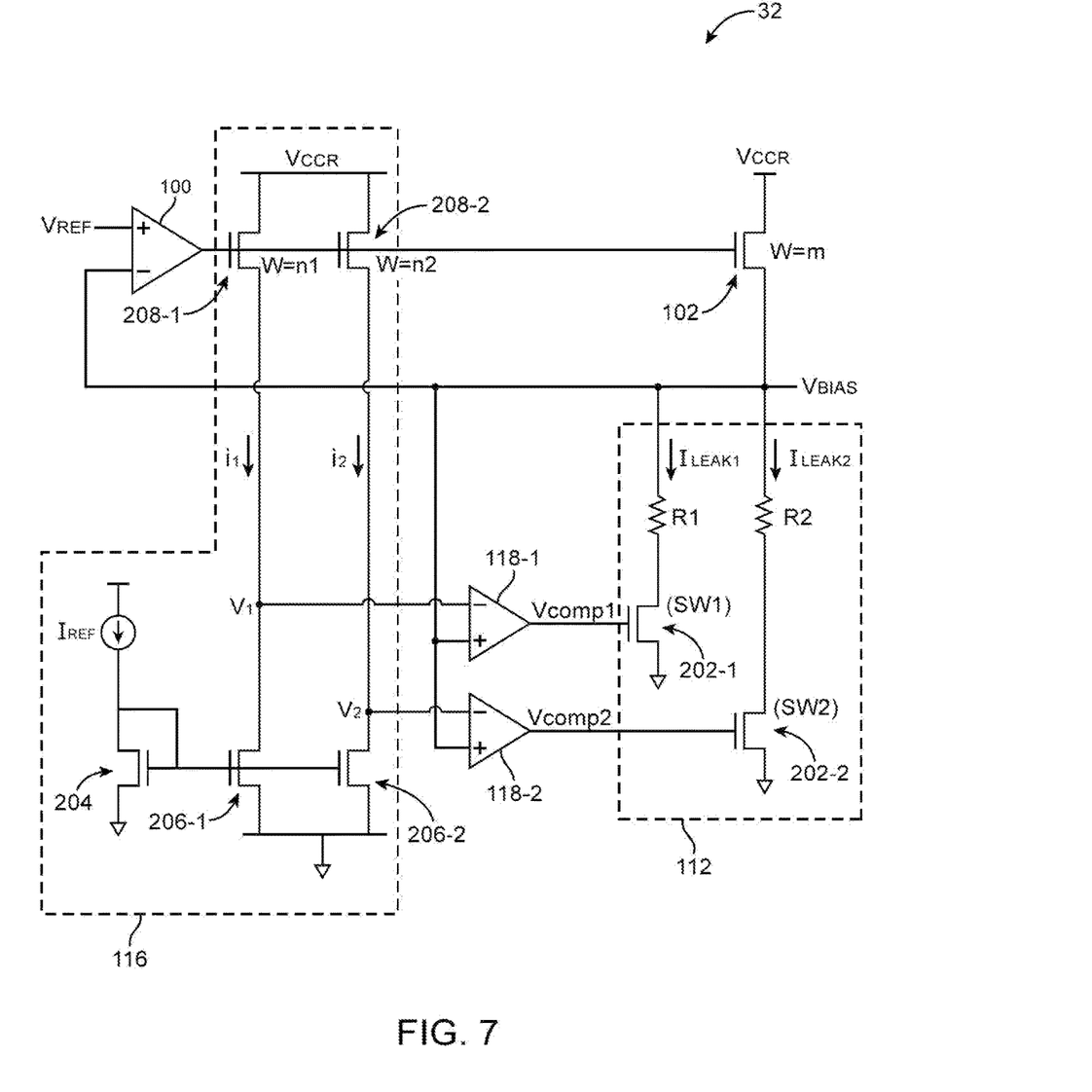
FIG. 7 is a circuit diagram showing another suitable circuit implementation of a voltage regulator with two adaptive current bleeder paths in accordance with an embodiment of the present invention.

The example of FIG. 3 in which only one current leaker path 112 is shown is merely illustrative and does not serve to limit the scope of the present invention. If desired, voltage regulator 32 may have adaptive bleeder circuit 110 that includes two or more current leaker paths. FIG. 7 is a circuit diagram that shows another suitable implementation of voltage regulator 32 that includes two current leaker paths.

As shown in FIG. 7, current sensing circuitry 116 may include additional transistors 206-2 and 208-1 for implementing a second current mirroring branch. The current flowing through the first current mirror branch may be equal to i1, whereas the current flowing through the second current mirroring branch may be equal to i2. Currents i1 and i2 can fluctuate depending on the value of Vpg at any given point in time.

In the example of FIG. 7, pass transistor 102 may have a width m, whereas transistors 208-1 and 208-2 have widths n1 and n2, respectively. Generally, width m should be substantially larger than n1 and n2 since n-channel transistor 102 needs to be sufficiently large to drive the desired output load of the voltage regulator. The first branch may produce a first current sensing node on which voltage V1 is provided, whereas the second branch may produce a second current sensing node on which voltage V2 is provided. The particular ratio of m to n1 and n2 should be chosen such that voltages V1 and V2 are approximately equal to Vbias during normal operating conditions. Furthermore, reference voltage Iref should be chosen such that i1 and i2 remains fairly constant over various operating conditions.

Comparator 118-1 may have a first (+) input that receives Vbias from the regulator output, a second (−) input that receives V1 from the first current mirroring branch, and an output that controls a first leaker path 112. Similarly, comparator 118-2 may have a first (+) input that receives Vbias from the regulator output, a second (−) input that receives V2 from the second current mirroring branch, and an output that controls a second leaker path 112. The first leaker path may include a first resistor R1 coupled in series with transistor 202-1 between the regulator output and ground. The second leaker path may include a second resistor R2 coupled in series with transistor 202-2 between the regulator output and ground. Transistor 202-1 has a gate that is controlled by the output of comparator 118-1 and can allow first bleeder current Ileak1 to flow when a first criteria is met. Transistor 202-2 has a gate that is controlled by the output of comparator 118-2 and can allow second bleeder current Ileak2 to flow when a second criteria that is different than the first criteria is met.

Figure 8:
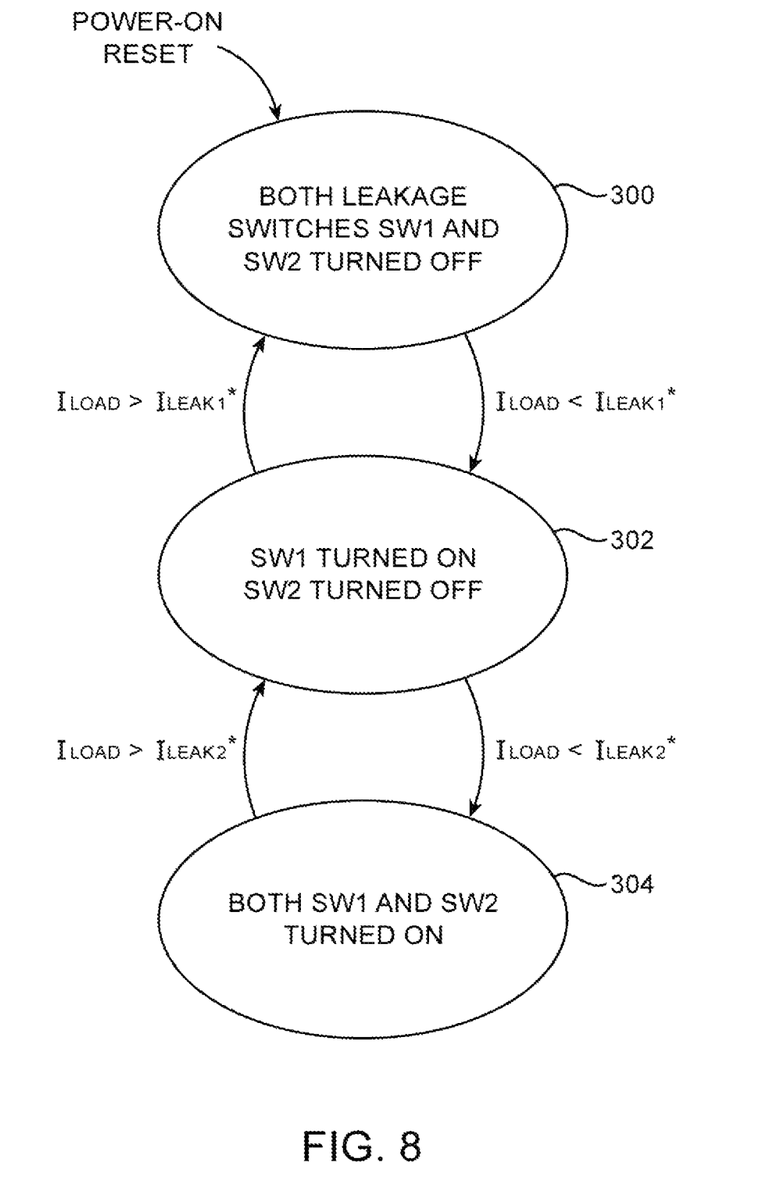
FIG. 8 is a diagram showing possible states in which the voltage regulator of FIG. 7 may be operated in accordance with an embodiment of the present invention.

The behavior of voltage regulator 32 of FIG. 7 can be illustrated by the state diagram of FIG. 8. Upon power-on reset operations, the voltage regulator may be placed in a first state 300 in which both leakage switches (e.g., transistors 202-1 and 202-2 of FIG. 7) are turned off.

When the output current load Iload falls below a first minimum required current leakage threshold Ileak1*, comparator 118-1 will detect this change and then assert Vcomp1 to turn on transistor 202-1 to allow flow of the first bleeder current Ileak1 (e.g., the voltage regulator may transition from the first state 300 to the second state 302).

While regulator 32 is in the second state, if the output current load Iload further falls below a second minimum required current leakage threshold Ileak2*, comparator 11802 will detect this change and then assert Vcomp2 to turn on transistor 202-2 to allow flow of the second bleeder current Ileak2 (e.g., the voltage regulator may transistor from the second state 302 to a third state 304 to turn both leaker switches on).

While regulator 32 is in the third state, if the output current load Iload rises higher than Ileak2*, comparator 118-2 will detect this change and then deassert Vcomp2 to turn off transistor 202-2 and switch the second bleeder path out of use (e.g., the voltage regulator may transition from third state 304 back to the second state 302). While regulator 32 is in the second state, if the output current load Iload rises higher than Ileak1*, comparator 118-1 will detect this change and then deassert Vcomp1 to turn off transistor 202-1 and switch the first bleeder path out of use (e.g., the voltage regulator may transition from second state 302 back to the first state 300). If desired, the operation of regulator 32 may transition between states 300 and 304 without traversing intermediate state 302.

Operated in this way, voltage regulator 32 only provides the extra bleeder current under a first criteria when the load current is less than the predetermined required leakage threshold Ileak1* (e.g., by turning on one bleeder path) and under a second criteria when Iload is less than threshold Ileak2* (e.g., by turning turn more than one bleeder path). Extra current provided in this way will not contribute to the total current consumption since the leaker paths 112 are switched out of use the majority of the time. The use of adaptive bleeder circuit 110 that monitors the current flowing through pass transistor 102 in real time and that selectively activates the leaker path(s) 112 based on the monitored current may therefore help substantially reduce current consumption of the voltage regulator while maintaining stability of the system across PVT variations. Depending on the requirements of the integrated circuit, voltage regulator 32 may be provided with three or more current leaker paths, four or more current leaker paths, five or more current leaker paths, etc.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. Voltage regulator circuitry, comprising:
   an operational amplifier;
   a pass transistor coupled to the operational amplifier in a negative feedback configuration; and
   an adaptive bleeder circuit that is coupled to the pass transistor and that is selectively activated to provide at least one leakage current path for the voltage regulator circuitry, wherein the adaptive bleeder circuit includes current sensing circuitry and voltage comparison circuitry, wherein the current sensing circuitry has an input that is connected to an output of the operational amplifier and has an output that is connected to an input of the voltage comparison circuitry, wherein the input of the voltage comparison circuitry is shorted to an input of the operational amplifier, wherein the pass transistor is used to deliver a load current, and wherein the leakage current path in the adaptive bleeder circuit is activated when the load current falls below a predetermined threshold and is deactivated when the load current exceeds the predetermined threshold.

2. The voltage regulator circuitry defined in claim 1, wherein the leakage current path includes a resistor and a switch coupled in series with the pass transistor.

3. The voltage regulator circuitry defined in claim 2, wherein the adaptive bleeder circuit further includes a control circuit that generates an output signal for controlling the switch.

4. The voltage regulator circuitry defined in claim 3, wherein the control circuit in the adaptive bleeder circuit includes the current sensing circuitry and voltage comparison circuitry.

5. The voltage regulator circuitry defined in claim 4, wherein the current sensing circuitry comprises current mirroring circuitry.

6. The voltage regulator circuitry defined in claim 4, wherein the voltage comparison circuitry comprises a comparator having a first input that receives a sensing voltage from the current sensing circuitry, a second input that is directly coupled to the pass transistor, and an output on which the output signal of the control circuit is provided.

7. The voltage regulator circuitry defined in claim 4, wherein the voltage comparison circuitry exhibits hysteresis.

8. A method of operating voltage regulator circuitry, comprising:
   using a pass transistor in the voltage regulator circuitry to deliver a load current at an output node;
   using an operational amplifier in the voltage regulator circuitry to control the pass transistor;
   with an adaptive bleeder circuit in the voltage regulator circuitry, selectively activating a bleeder current path at the output node, wherein selectively activating the bleeder current path comprises:
      enabling the bleeder current path in response to determining that the load current falls below a first predetermined threshold level; and
      disabling the bleeder current path in response to determining that the load current exceeds the first predetermined threshold level; and
   selectively activating an additional bleeder current path at the output node.

9. The method defined in claim 8, wherein the bleeder current path includes a resistor and a switch, and wherein selectively activating the bleeder current path comprises selectively turning on the switch when a predetermined criterion is met.

10. The method defined in claim 8, further comprising:
with current sensing circuitry in the adaptive bleeder circuit, monitoring an amount of current that flows through the pass transistor to produce a corresponding sensing voltage.

11. The method defined in claim 8, wherein selectively activating the additional bleeder current path comprises:
enabling the additional bleeder current path in response to determining that the load current falls below a second predetermined threshold level that is different than the first predetermined threshold level; and
disabling the bleeder current path in response to determining that the load current exceeds the second predetermined threshold level.

12. The method defined in claim 10, further comprising:
with voltage comparator circuitry in the adaptive bleeder circuit, receiving the sensing voltage from the current sensing circuitry at a first input, receiving a regulated voltage at a second input, and outputting a corresponding control signal that determines whether the bleeder current path is activated.

13. Circuitry, comprising:
first and second power supply lines;
a pass transistor having a first source-drain terminal that is coupled to the first power supply line, a gate terminal, and a second source-drain terminal;
an operational amplifier having a first input that receives a reference voltage, a second input that receives a regulated voltage from the second source-drain terminal of the pass transistor, and an output that is coupled to the gate terminal of the pass transistor;
a current leaker path having a resistive circuit and a switching component directly coupled in series between the second source-drain terminal of the pass transistor and the second power supply line; and
an additional current leaker path having another resistive circuit and another switching component coupled in series between the second source-drain terminal of the pass transistor and the second power supply line.

14. The circuitry defined in claim 13, wherein the switching component in the current leaker path is activated in response to a first criterion being satisfied, and wherein the another switching component in the additional current leaker path is activated in response to a second criterion that is different than the first criterion being satisfied.

15. The circuitry defined in claim 13, further comprising:
current sensing circuitry that monitors how much current is flowing through the pass transistor and that produces first and second current sensing voltage signals.

16. The circuitry defined in claim 15, further comprising:
a first comparator having a positive input that receives the regulated voltage, a negative input that receives the first current sensing voltage signal, and an output that is coupled to the switching component in the current leaker path; and
a second comparator having a positive input that receives the regulated voltage, a negative input that receives the second current sensing voltage signal, and an output that is coupled to the another switching component in the additional current leaker path.

* * * * *